United States Patent [19]

Becker

[11] Patent Number: 4,973,202

[45] Date of Patent: Nov. 27, 1990

[54] HOOD ASSEMBLY DEVICE FOR REMOVAL OF UNDESIRED GLASS PARTICLES

[76] Inventor: Charles Becker, 5672 Oakmeadow Dr., Yorba Linda, Calif. 92686

[21] Appl. No.: 375,724

[22] Filed: Jul. 5, 1989

[51] Int. Cl.$^5$ .............................................. B65G 53/24
[52] U.S. Cl. .................................. 406/151; 406/152; 406/117; 15/301; 65/27
[58] Field of Search ............... 406/151, 173, 117, 175, 406/152, 153; 65/27, 168, 159; 209/643, 936; 198/493; 15/301

[56] References Cited

U.S. PATENT DOCUMENTS 4,233,048 11/1980 Gintert ..................................... 65/27
4,318,643 3/1982 Larsson et al. .................. 406/151 X

FOREIGN PATENT DOCUMENTS 104827 6/1983 Japan .................................. 406/173

Primary Examiner—Joseph F. Peters, Jr.
Assistant Examiner—James M. Kannofsky
Attorney, Agent, or Firm—Stuart W. Knight

[57] ABSTRACT

Undesired glass particles emitted into the atmosphere from breakage of glass jars in the manufacturing process are removed utilizing an exhaust system, comprising a hood, exhaust piping, blower and cyclone. The hood and exhaust system protects the area adjacent to where glass jars are produced from emission of dangerous glass particles which result from breakage of glass jars during the assembly process.

3 Claims, 2 Drawing Sheets

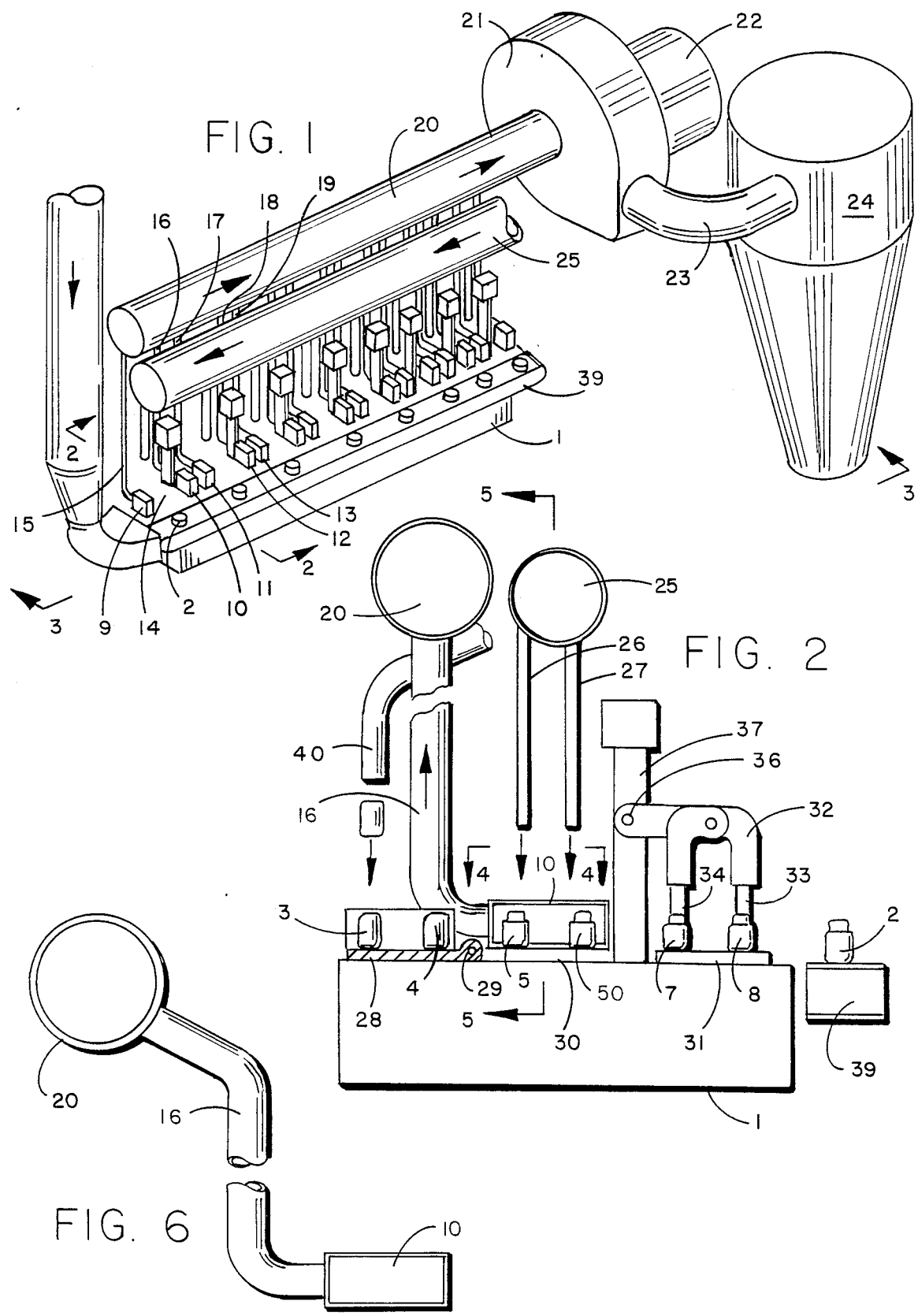

HOOD ASSEMBLY DEVICE FOR REMOVAL OF UNDESIRED GLASS PARTICLES

INTRODUCTION:

The invention relates to a method of removing undesired glass particles emitted to the atmosphere upon breakage of glass products during production of glass articles, such as glass jars. More particularly, the invention relates to the removal of such glass particles by means of a vacuum system placed in close proximity to the area where such breakage of glass occurs.

BACKGROUND OF THE INVENTION:

Glass products, such as glass jars and the like, are produced utilizing a glass blow mold system. A mold is first produced in the shape of the articles desired; molten glass is placed within the mold; the mold is removed; and the molten glass is subjected to a cooling process with the resultant solidification of the molten glass and the formation of the glass product. Naturally, the process is automated. Various mechanical means are utilized to transport the solid glass article from one "work area" to another. At times during such process, mechanical mishaps occur with the result that the glass article is broken, or parts thereof are separated from the remainder of the article. The result is that such glass particles from such breakage is emitted into the atmosphere adjacent to the work area. Assembly workers are subjected to injury from such loose glass particles. Additionally, the glass particles contaminate or damage other glass products in process. Such undesired glass particles emitted into the atmosphere include glass dust, glass splinters and other pieces of glass which can approximate one half inches in diameter. For purposes of discussion herein, such glass shall be referred to as glass particles.

At present, there is no efficient means for elimination of the above-described hazard and for removal of such glass particles from the atmosphere prior to such glass particles causing injury to persons or other glass products.

Accordingly, one object of the invention is to provide a system for removal of undesired glass particles emitted into the atmosphere during an automated glass product manufacturing process. Another object of the invention is to minimize exposure to operators and to protect them from such undesired particles. Other objects of the invention will be apparent from the following description.

BRIEF DESCRIPTION OF THE INVENTION:

The invention comprises the utilization of a vacuum system placed adjacent to and in close proximity to the manufacturing area ("work area") where glass breakage occurs. Such vacuum system includes one or more hoods, exhaust ducting, and an exhaust blower. In normal operation, breakage of the jar occurs in a certain assembly area during the solidification and mechanical removal process. The hood of the invention is placed in close proximity thereof. An exhaust vacuum is placed in or on the hood so that such atmospheric glass particles are drawn into the hood and are removed from the system by the exhaust created by the blower. A "cyclone" is placed downstream of the blower. Air is injected into the cyclone so that the glass particles are subjected to a "cyclone" or rotation process so that the glass particles can be removed from the bottom of the cyclone.

DESCRIPTION OF THE DRAWINGS:

FIG. 1 is a perspective view of the glass fabricating machine and glow mold stations.

FIG. 2 is a side view of the glass manufacturing machine.

FIG. 6 is a schematic view of the exhaust system.

Figure 3:
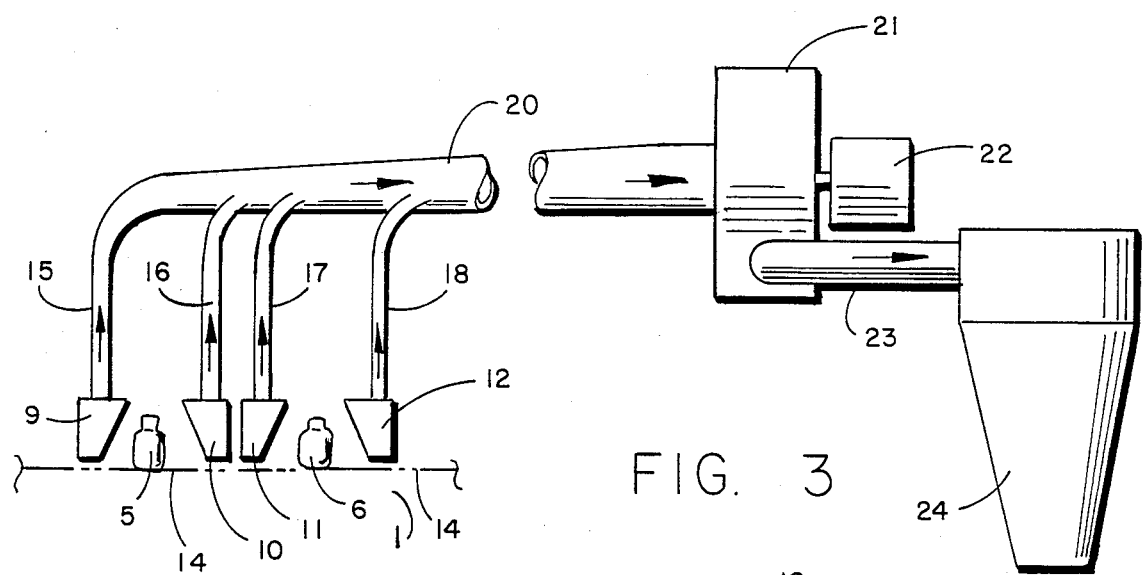
FIG. 3 is a schematic view of the exhaust system of the invention.

DETAILED DESCRIPTION OF THE INVENTION:

FIG. 3 shows a schematic view of the invention.

A number of hoods 9, 10, 11, and 12 are placed adjacent to the "work area" 14 wherein breakage of glass articles and process occur. Jars 5 and 6 are shown in such "work area" 14. Details of how such breakage occurs and a brief description of the manufacturing process will be described hereinafter.

A blower 21 driven by motor 22 places a vacuum on the main duct line 20. A series of pipes or ducts 15, 16, 17 and 18 connect main duct 20 to each of the hoods 9, 10, 11 and 12. A cyclone 24 is shown downstream of the blower and connected to the blower by duct or line 23. The vacuum is thus placed on the hoods. In the event that glass jar five breaks or a portion thereof splinters from the remainder, the vacuum of the hood removes such glass particles from the atmosphere. It can be seen that hoods 9 and 10 surround the work area 14 where breakage of glass jar 5 can occur.

Figure 4:
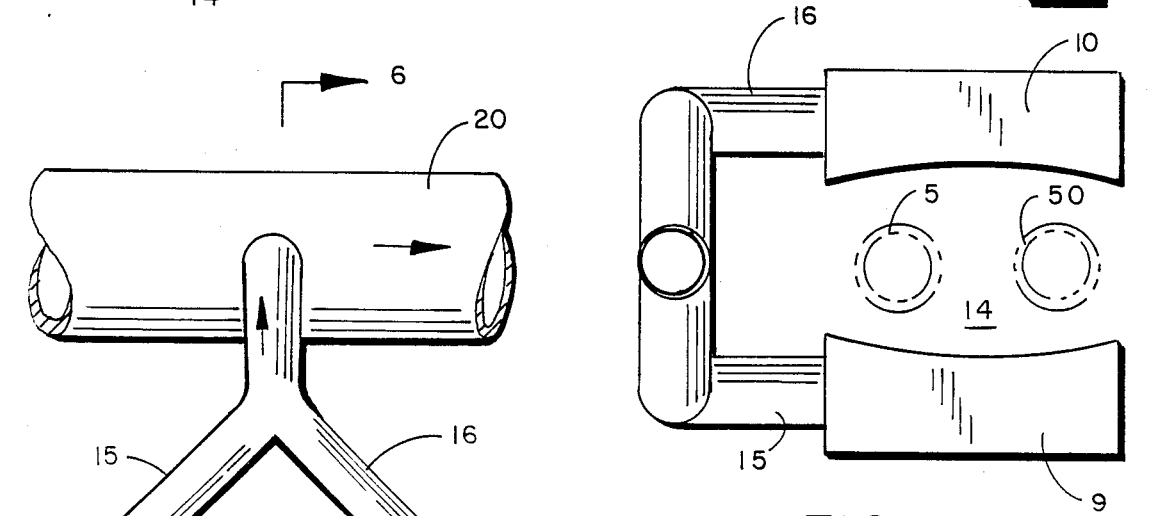
FIG. 4 is a top view of the hood and connected duct work.

FIG. 4 shows a top view of the hoods 9 and 10 which are placed herein and around the work area 14 where there are two glass jars 5 and 50. Ideally, the glass hoods will completely surround the work area 14 for maximum benefit. However, the mechanics of the manufacturing process limit the ability to place the hoods completely about the glass jars or other glass article. The vacuum of the system may be sufficient to draw all of the glass particles into the hood, even though the hoods do not completely surround the jars. Generally, there should be a sufficient vacuum on the system or working area when the hoods substantially surround the work area. What is substantial depends on the parameters of the system. Preferably the hoods are 120–240 degrees around the glass article or work area. Obviously, the amount of protection given is somewhat dependent on the amount of vacuum and the amount of area of the hood which surrounds the subject glass jars.

Figure 5:
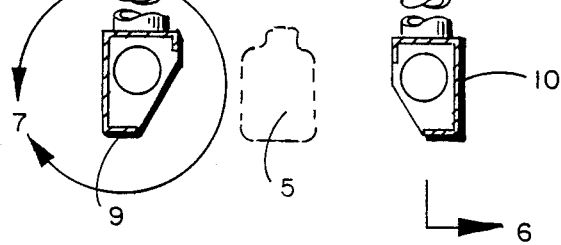
FIG. 5 is a front view of the exhaust hood and duct work.
Figure 7:
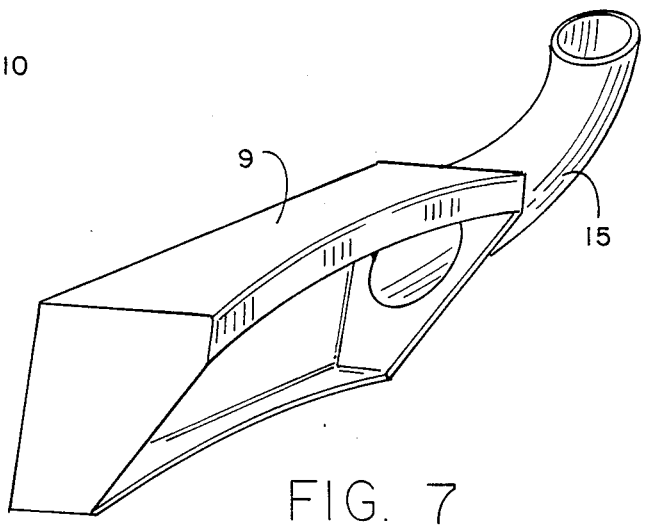
FIG. 7 is a detailed enlarged view of the hood of the invention.

FIG. 5 shows the subject glass jar 5 between two hoods 9 and 10. Such example, the outlet lines 15 and 16 from the hoods merge and form a "T" with the main duct 20. FIG. 7 shows a typical hood 9 with outlet line 15, however, any particular hood device is within the scope of the invention. The term "hood" simply means a "collecting element" where glass particles are drawn into by the vacuum placed on the system.

FIGS. 1 and 2 show the glass manufacturing process with the vacuum system invention incorporated therein.

There is shown a foundation or assembly platform 1. There is a conveyor belt or rotating member 39 contained on the platform 1. Solid glass jars are produced by molten glass being poured or placed into the molds 3 and 4 through line 40. The molds 3 and 4 are contained on a rotating platform or member 28 which is pivoted about hinge 29. After the molten glass is poured in the jars 3 and 4, platform 28 is rotated with the molds then placed on platform 30, as shown. The molds are then subjected to exposure to the atmosphere with resultant molten cooling. Additionally, cold air is placed on the molten glass from duct 25 utilizing lines 26 and 27. Thus, the solid glass is formed on platform 30. A mechanical transporting device 32 utilizing clamps 33 and 34 pick up the solid jars from platform 30 onto another platform 31. It can be seen in FIG. 2 that the jar 2 is placed on the conveyor belt 39 as shown.

At times there is a misalignment of the clamps 33 and 34 with the jars 5 and 50, such that such jars are broken. Also, jars may become unstable and tumble onto one or more of the subject platforms resulting in breakage of the jars. In such event, glass particles are emitted into the atmosphere about such "work area".

FIG. 2 shows the hood 9 placed in close proximity to jars 5 and 50 contained in the "work area". The term "work area" means the area where breakage of the glass jars can occur. In the example given, the clamps 33 and 34 of the mechanical lifting and moving device 33 sometimes misalign with the jar resulting in breakage thereof This can occur around the platform 30 or around the platform 31. Both of such areas are included within the definition of "work area". In any event, upon breakage of the jars, the vacuum eliminates or minimizes the emission of the glass particles into the atmosphere. Also, the vacuum greatly reduces the probability of broken glass contaminating other jars.

FIG. 1 shows a series of hoods 9, 10, 11, 12 and 13 placed on the area where jars are produced and moved. A series of upright pipes or ducts 15, 16, 17, 18 and 19 connect the hood to the main duct 20. The main duct 20 is likewise connected to the blower 21 which is driven by motor 22. Line 23 connects blower 21 to cyclone 24. As indicated, blower 21 places a vacuum on the hood so that glass particles can be transported from the "work area" to the cyclone 24 for subsequent removal of the glass particles. Any glass particles from cyclone 24 can be melted down for future use.

The particular dimensions of the hood, exhaust piping and other mechanical features described herein depend on various design factors known in the art. Generally, however, the hood is 6 to 72 inches in length and 2 to 24 inches in width. The exhaust piping connected to the hood is generally 2 to 6 inch diameter piping or ducting. The exhaust duct is generally 10 to 30 inches in diameter In a typical exhaust system, the volume of air approximates 250 cubic feet per minute in the hood area with an exhaust velocity of 5600 feet per minute. However, as indicated, the particular dimensions and operating factors are not a limitation to the invention, nor the essence thereof, since the particular design depends on the particular system and results desired.

Generally, the hood is placed about $\frac{1}{2}$ to 24 inches from the particular jar or glass article. As indicated, it is desirable that one or more hoods completely surround the system for maximum benefit Hoods should surround at least 50% of the work area, and generally 50 to 80 percent coverage is desired and adequate

I claim:

1. In a glass manufacturing and assembly system, and wherein glass articles are produced from molten glass, and wherein glass articles are formed on a moving platform; a safety device to remove undesired glass particles emitted into the atmosphere from breakage of glass articles comprising:
    (a) one or more hoods placed $\frac{1}{2}$ to 24 inches from and horizontally to each of said glass articles;
    (b) a blower; and
    (c) exhaust piping and duct means connecting said one or more hoods to said blower whereby said blower creates a vacuum within said hood.

2. The device of claim 1 wherein said one or more hoods substantially surround the glass articles manufactured so that glass particles which are the result of breakage of the glass jars are removed into such hood.

3. The device of claim 1 wherein said one or more hoods surround 50 to 80 percent of the horizontal area about said glass articles.

* * * * *